UNITED STATES PATENT OFFICE.

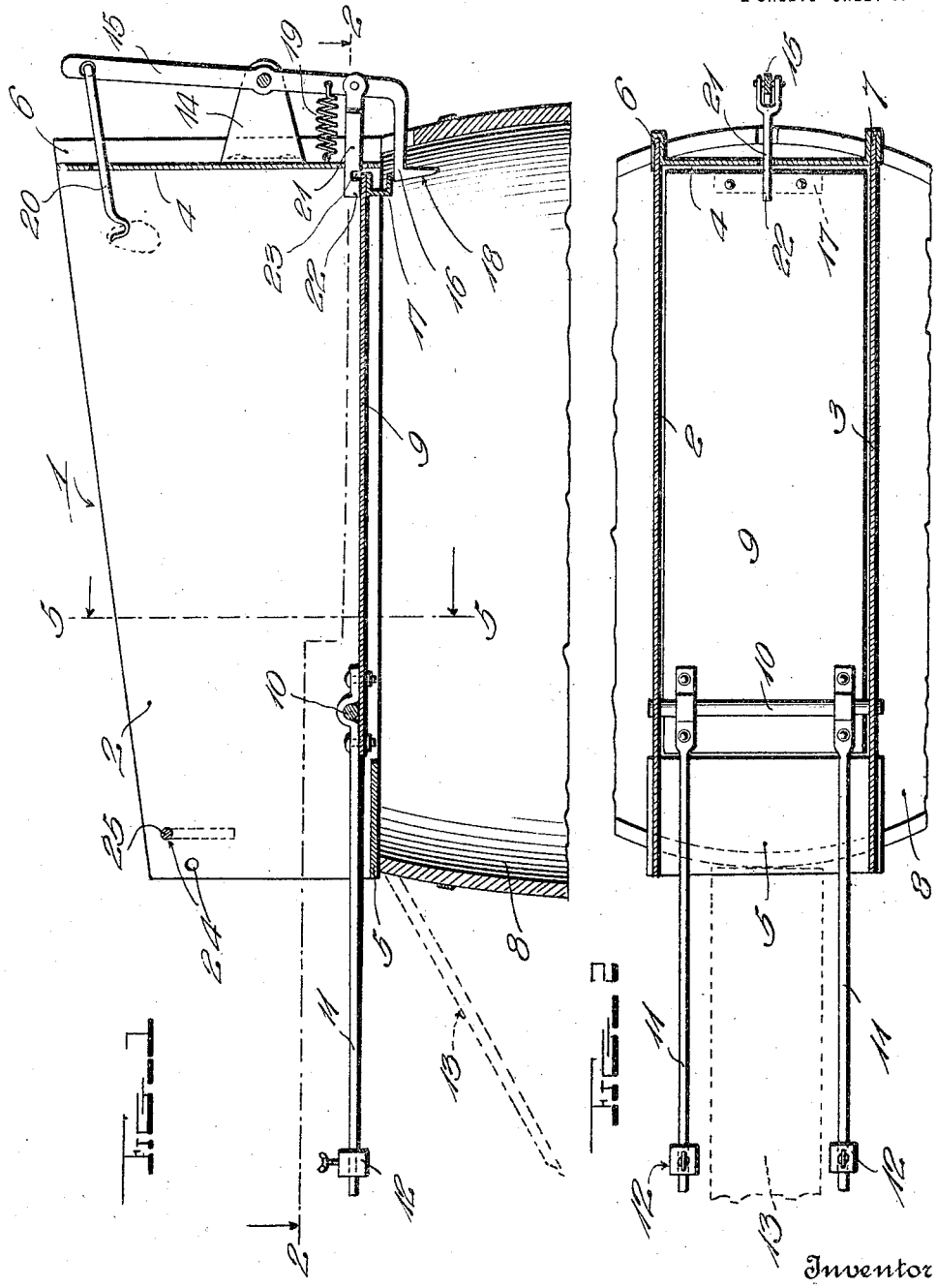

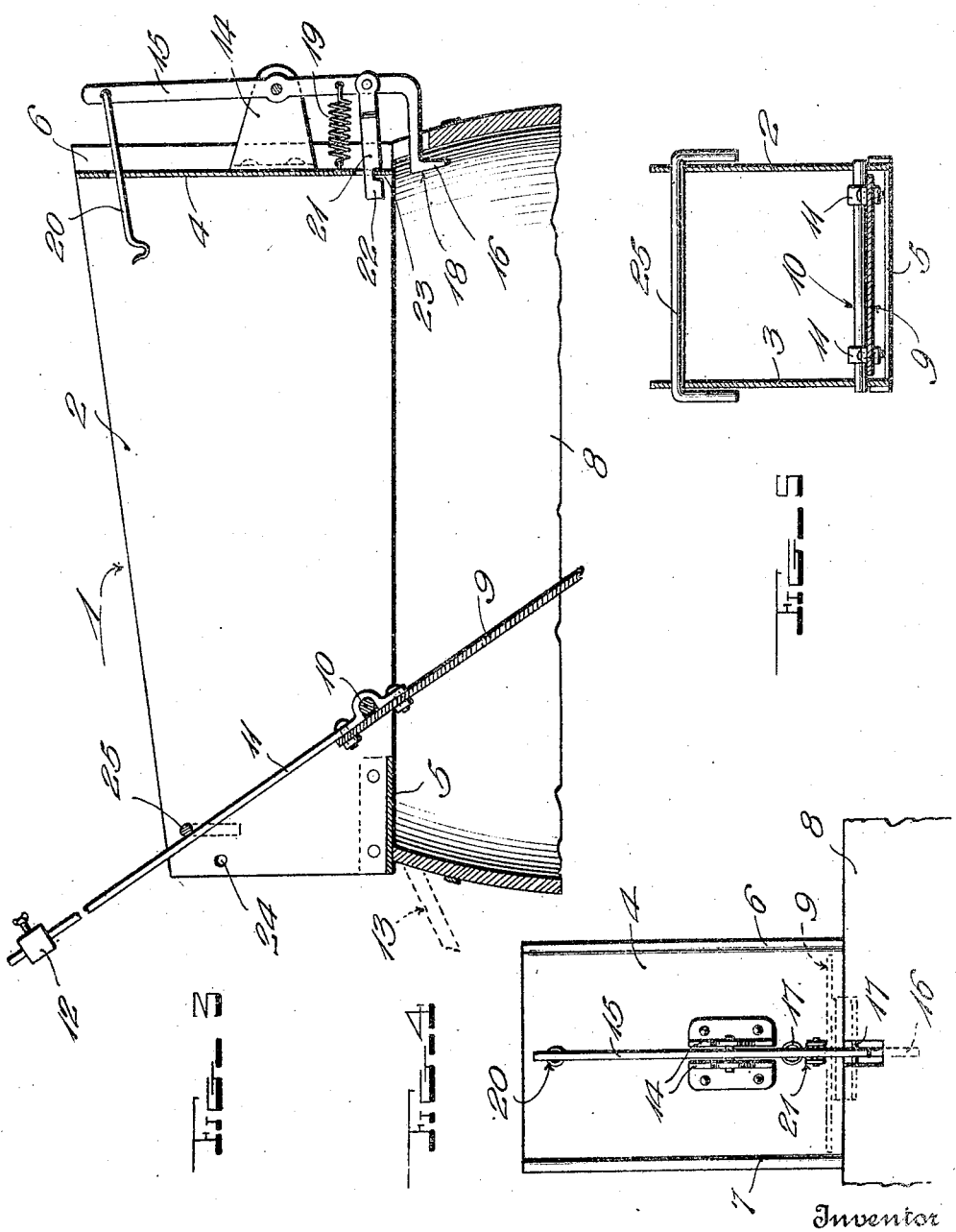

HENRY P. HAZE, OF SHELDON, IOWA.

RAT AND MOUSE TRAP.

1,245,911.

Specification of Letters Patent.

Patented Nov. 6, 1917.

Application filed April 26, 1917. Serial No. 164,728.

*To all whom it may concern:*

Be it known that I, HENRY P. HAZE, a citizen of the United States, residing at Sheldon, in the county of O'Brien and State of Iowa, have invented certain new and useful Improvements in Rat and Mouse Traps; and I do declare the following to be a full, clear, and exact description of the invention, such as will enable others skilled in the art to which it appertains to make and use the same.

My invention relates to traps and more particularly to that class of traps which are employed to catch rodents and the like and which are provided with swinging trap doors located in their bottoms.

The principal object of my invention is to provide a trap of this character which is self-setting and automatic in its action and in which positive means are provided for the actuation of the trap door in the bottom of the trap.

Another object of my invention is to provide in a trap of this character, a novel form and construction of a retaining catch for the trap door which will be automatically cleared from the path of travel of the door when the trap is sprung.

Another object of my invention is to provide a trap of this character which is cheap to manufacture, simple and easy to operate and which will at all times operate in the most efficient manner.

With these and other general objects in view, which will appear from the description, my invention resides in the novel combination and arrangement of parts to be hereinafter more fully described and claimed, and taken in connection with the drawings forming a part of this application and in which:

Figure 1 is a longitudinal central vertical section through my improved trap in set position;

Fig. 2 is a horizontal section on the line 2—2 of Fig. 1;

Fig. 3 is a view similar to Fig. 1 but showing the trap in sprung position;

Fig. 4 is an end elevation of the trap at the end carrying the catch mechanism; and, Fig. 5 is a transverse vertical section on the line 5—5 of Fig. 1.

In this embodiment of my invention as illustrated in the accompanying drawings, I have shown my trap as constructed of that type of traps which are adapted to be disposed over the tops of barrels or boxes or any suitable receptacles which will be filled with water or are adapted to receive and retain rats and mice therein, but it is perfectly obvious that this trap may be used with slight modifications over any type of receptacle or disposed over any suitable pits or used in many other various ways, depending upon the conditions under which a trap will be called upon to operate.

Briefly described, my invention comprises substantially a trap which has a body having a trap door formed in its bottom and provided with weights to return the trap door to its normally closed position after the trap has been sprung. At one end of the trap a spring-operated catch is disposed normally in engagement with the under side of the trap door and in connection with a trigger adapted for carrying bait thereon so that when the trigger is actuated by the animal, the catch will be drawn out of engagement with the under side of the trap door which will then tilt downwardly under the weight of the animal thereupon and deposit the animal into the pit below the trap, whereupon the weights will return the door to its normal position. When the trap has been sprung, means are provided for holding the catch in open position and clear of the path of travel of the door so as to permit a free movement of the door and when the door is returned to its normally closed position, it will operate upon the means for holding the catch in open position so as to automatically return the catch to engaged position to hold the door closed.

Referring more particularly to the accompanying drawing, in which like reference characters indicate corresponding parts throughout the several views, the trap comprises a body 1 which is substantially rectangular in shape and has its two longitudinal side walls 2 and 3 respectively made larger at one end than at the other. At a point spaced inwardly from the enlarged ends of the side walls 2 and 3, the walls are connected by a transversely extending end wall 4 which may be attached thereto in any suitable manner. In this preferred embodiment of my invention, I have used in its construction sheet metal but it is perfectly obvious that any materials may be used that will answer the purpose required and that they may be constructed and secured in any desired manner.

At the opposite reduced end of the trap, the side walls are connected by a transversely extending strip 5 which forms a bottom portion at that end of the trap and which is suitably secured to the walls of the trap so as to provide a support for the trap at the reduced end. Owing to the construction of the connecting end wall 4 at the opposite end of the trap, the side walls will be continued to provide extending flanges 6 and 7 respectively which will form supporting members for the adjacent end of the trap so that the trap may be disposed over the top of a barrel or box 8 as clearly illustrated in Fig. 1.

The bottom of the trap comprises a single trap door 9 adapted to entirely close the remaining portion of the bottom of the trap and pivotally suspended on a pivot rod 10 extending transversely between the side walls of the trap adjacent the reduced end of the same, which end is left open to provide an entry for the animals into the trap. This pivotal point of connection of the swinging door is located adjacent one end which I preferably call its rear end and secured to the door and extending rearwardly through the open end of the trap is a pair of rods 11 adapted for carrying adjustable weights 12 suitably secured on their outer ends which will provide a means for automatically holding the trap door 9 in horizontal position and returning the same in this position when the trap has been sprung. These rods 11 extend at each side of the trap door adjacent the sides of the trap with a sufficient clearance therebetween to provide for a suitable runway 13 disposed at the open end of the trap to permit of the entry of rodents thereinto. This runway and barrel or receptacle form no part of my invention but I merely illustrate it to show a manner of application of the trap.

The closed end of the trap which I shall hereinafter call the front end, is provided on the transversely extending end wall 4 with a pair of centrally located outwardly projecting lugs 14 having pivoted between their outer ends a lever 15 extending vertically in spaced relation to the end wall and having its lower end bent inwardly to provide a catch member 16 which is extended inwardly a sufficient distance to be engaged under a shoulder 17 secured on the front end of the swinging trap door 9 which will be disposed normally slightly above the extreme bottom of the trap as clearly shown in Fig. 1. The catch member 16 is provided with a downwardly extending bevel guide member 18 the purpose of which is to be hereinafter described.

As a means for retaining the catch member engaged under the shoulder 17 on the swinging trap door and thereby locking the trap door normally in closed position, I provide a retractile coil spring 19 having its ends connected in the end wall 4 and to the lever 15 respectively adjacent the lower end of the lever. At the upper end of the lever is connected a trigger comprising a link 20 loosely secured thereto and extending downwardly therefrom through an aperture in the adjacent end wall of the trap and projecting inwardly into the trap and suitably adapted at its inwardly projecting end to hold any desired bait thereon.

When the trigger 20 is sufficiently actuated, the lever will be rocked on its fulcrum point at the ends of the lugs 14 to draw the catch member 16 outwardly and out of engagement with the shoulder 17 on the bottom of the swinging trap door 9, and the weight of the animal on the door will cause the same to be tilted in the manner hereinbefore described.

It is obvious that after the door has been tilted and unless provision were made, the catch member would swing inwardly again under the action of the spring 19 so as to be disposed in the path of the swinging door and thereby check the return of the door to its normal horizontally closed position. As a means of preventing this, I provide an arm 21 which is pivotally connected at its outer end to the lever 15 and which projects inwardly in the trap through a slot formed in the adjacent end wall of the trap so as to dispose its inner projecting end 22 normally above the top of the swinging trap door 9 resting thereupon as clearly illustrated in Fig. 1. At its inner projecting end, the arm 21 is provided with a notch 23 in its lower edge which will be engaged over the adjacent edge of the slot when the lower end of the lever is drawn outwardly so as to dispose the arm 21 in locked position with respect to the wall. I desire it to be understood that I do not specifically limit myself to the construction of this notch and it is obvious that any preferred construction may be utilized that will provide a shoulder on the arm to be engaged over the adjacent edge of the slot when the lower end of the lever is drawn outwardly upon springing of the trap and accordingly I have referred to this construction in the appended claims as a shoulder which is intended to generally indicate any desired type of construction provided at this point.

In the operation of my trap, the swinging trap door in the bottom is normally locked in closed position by the engagement of the catch 16 on the under side of the shoulder 17 and when the animal in pulling at the bait secured on the trigger link 20 causes the lever 15 to rock on its fulcrum, the catch 16 will be slid outwardly and disengaged from the shoulder 17 and the door will be tilted as hereinbefore described. When the lower end of the lever is thus rocked outwardly against the tension of the retractile spring 19, the pivotally connected arm 21 will be also drawn outwardly to dispose the notch or shoulder 23 into engagement with the adjacent edge of the slot provided in the end wall and which will retain the catch member in open position as clearly illustrated in Fig. 3. The inner projecting end 22 of this arm will be thereupon slightly lowered and will be disposed directly in the path of travel of the door 9 so that upon the upward return movement of the door through the action of the weights, the end of the door will contact with the projecting end 22 and lift the same, thereby disengaging the shoulder or notch from the adjacent edge of the slot and permitting the retractile spring 19 to draw the catch 16 inwardly into engagement with the under side of the shoulder on the trap door as hereinbefore described, whereupon the door will again be locked in its normally closed position and the trap reset to provide against any possible binding of the end of the trap door and the end of the catch 16, the guide member 18 being formed on the catch so that the end of the door will strike against the beveled portion of the guide member and if necessary will cause the catch to be pushed slightly farther outward to allow the door to swing into a closed position.

As a means of limiting the swinging of the trap door, I provide a series of alined apertures 24 in the side walls adjacent the open end of the trap through which can be positioned a transversely extending rod 25 against which the weight rods 11 will abut when the door is swung downwardly.

While I have shown and described certain specific materials used in the construction of my trap and have gone considerably into the details thereof, I desire it to be understood that I do not wish to limit myself specifically to these details and materials used in the manner described but any such may be utilized and that any modifications or changes may be made in the construction of my improved trap as will fall within the scope of the appended claims.

I claim:—

1. A trap of the character described comprising a body having a trap door therein, a catch to hold said door normally in closed position, and animal operated means to release said catch and means to retain the same in open position.

2. A trap of the character described comprising a body having a self closing trap door therein, a catch to hold said door in normally closed position, animal operated means to disengage said catch to open said door, a retaining member to hold said catch in open position, said retaining member being so disposed as to be actuated by the closing of the trap door to reëngage said catch.

3. A trap of the character described comprising a body having a self closing trap door therein, a catch to engage said door and hold it in closed position, animal operated means to disengage said catch to open said door, a retaining member on said catch to hold it in open position when disengaged, said member extending in the path of said door to be actuated thereby when said door is returned to closed position, whereby to permit said catch to be reëngaged.

4. A trap of the character described comprising a body having a self closing trap door therein, a catch to engage said door and hold it in closed position, animal operated means to disengage said catch to open said door, an arm on said catch and projecting through one wall of said body in the path of travel of said door, means on said arm to engage said wall when said catch is released to hold said catch in open position, said door operating on the projecting portion of the arm to disengage the means on said arm from the wall to permit said catch to be reëngaged.

5. A trap of the character described comprising a body having a self closing trap door therein, a lever fulcrumed on one wall of said body, one end of said lever being disposed to engage said door to form a catch therefor and hold the door closed, a trigger on the other end of said lever, said wall having a slot therein, an arm connected at one end to said lever and projecting through said slot, a shoulder on said arm to engage one edge of the slot when the trap is sprung to hold said catch in open position, the free end of said arm being disposed in the path of said door to be actuated thereby to disengage said shoulder from the wall, when the door is returned to closed position, and means to reëngage the catch to hold the door closed.

6. A trap of the character described comprising a body to be disposed over the top of a barrel or the like, and having a self closing trap door in its bottom, a lever fulcrumed on one wall of said body, the lower end of said lever being extended inwardly to form a catch to engage the under side of said door to hold the same closed, said catch having a downwardly extending guide member thereon, a trigger on the other end of said lever, a spring to hold said catch engaged, said wall of the body having a slot therein, an arm pivoted at one end to said lever and projecting through said slot in the path of travel of said spring, said door on closing abutting against the projecting end of said arm to disengage its shoulder and permit said catch to be reëngaged by action of said spring.

In testimony whereof I have hereunto set my hand in the presence of two subscribing witnesses.

HENRY P. HAZE.

Witnesses:
L. P. STRUYK,
A. HAZE.